Aug. 20, 1929.  K. TESSKY  1,725,492
WORKPIECE FEED FOR MACHINE TOOLS
Filed Feb. 4, 1926
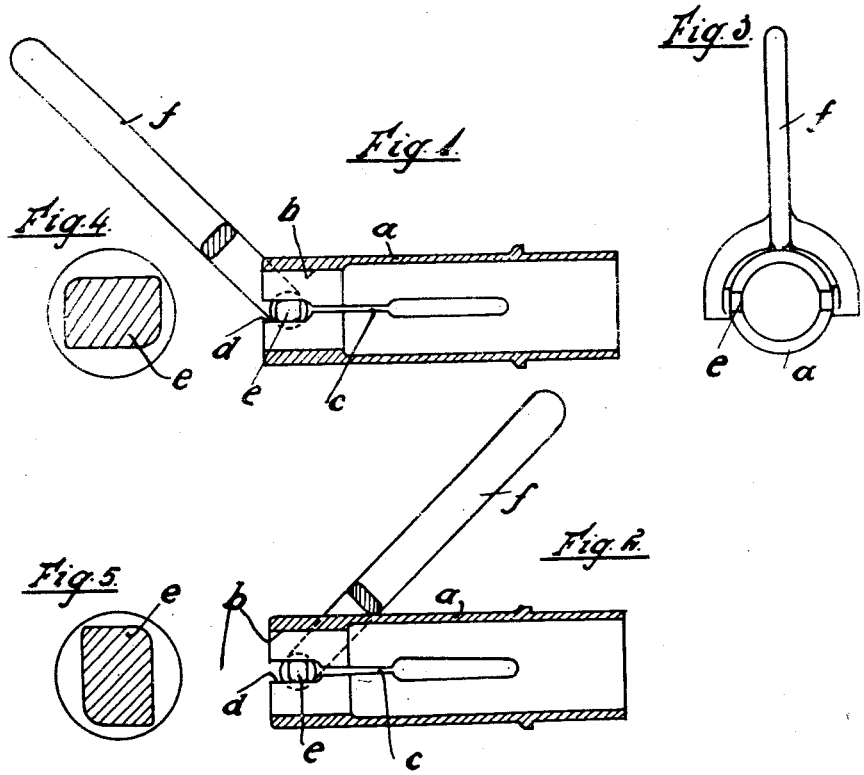

Patented Aug. 20, 1929.

1,725,492

UNITED STATES PATENT OFFICE.

KARL TESSKY, OF ESSLINGEN-ON-THE-NECKAR, GERMANY.

WORK-PIECE FEED FOR MACHINE TOOLS.

Application filed February 4, 1926, Serial No. 85,958, and in Germany February 21, 1925.

My invention refers to the work piece feed of machine tools, more especially of the kind which serves for feeding bar-shaped material. It is an object of my invention to provide a feed for such material which is simpler and more efficient than similar devices hitherto used.

In machine tools such as automatic lathes the step by step feed of bar-shaped material is effected by means of so-called feed-collets or spring grips which are mounted coaxially to the axis of the material. When the conical grip which holds the material during the operation of the lathe has been opened, the feed collet which surrounds the material with sufficient friction, feeds the same forward through the conical grip until so much of the material is placed in position for the action of the tools as is required in each case. After the conical grip has been closed again, the feed collet glides backwards on the bar of material. If such bar was operated upon to the last end, the introduction of a fresh bar required a considerable amount of work for the reason that the feed collet offered a certain resistance to the insertion of the fresh bar and had to be spread apart by the bar. Moreover the collet was frequently damaged during such introduction.

In the work piece feeding device according to the present invention these drawbacks are obviated by the provision of means, whereby the feed collet can be spread apart before the work piece is introduced into it.

In the drawings affixed to this specification and forming part thereof two embodiments of my invention are illustrated diagrammatically by way of example. In the drawings Figs. 1 and 2 are longitudinal sections of one embodiment showing the feed collet in closed and open position respectively.

Fig. 3 is an end view and

Figs. 4 and 5 illustrate the spreading member proper, drawn to a larger scale, in its position corresponding to Figs. 1 and 2, respectively.

Referring first to Figs. 1 to 5, $a$ is the tubular feed collet having substantially the form of a tube with two slots $c$ disposed diametrically opposite each other and extending in the axial direction of the tube, whereby two gripping jaws $b$ are formed. $d$ is a notch at the end of each slot, and $e$ is a square projecting from the outside into each notch, the two squares $e, e$ being mounted on the inner ends of a forked handle or lever $f$. Two opposite edges of the squares are preferably rounded as shown in Figs. 4 and 5, and the cross-section of the squares has the form of an oblong rectangle. In the position shown in Fig. 1, the squares project into the notches $d$ without exerting any spreading action. On the other hand, if the handle $f$ is turned from the position shown in Fig. 1 into the position shown in Fig. 2, whereby the squares are placed on edge in the notches $d$, the two jaws $b$ are spread apart, thereby allowing a new bar to be freely inserted in the grip and between the jaws.

I wish it to be understood that I do not desire to be limited to the exact details of constructions shown and described for obvious modifications will occur to a person skilled in the art.

I claim:—

1. Workpiece feed for machine tools comprising a tubular feed collet, jaws on said collet, a notch at one end of said collet between said jaws and a longitudinal slot extending from said notch over part of the length of said collet and allowing a tool inserted in said notch to spread apart the parts adjoining said slot.

2. Work piece feed for machine tools comprising a tubular feed collet split at one end and jaws on said collet, the split portion of said collet extending between said jaws and being so large as to permit the insertion of spreading means between said jaws.

In testimony whereof I affix my signature.

KARL TESSKY.